United States Patent
Willett et al.

(10) Patent No.: US 10,785,173 B2
(45) Date of Patent: Sep. 22, 2020

(54) SYSTEM AND METHOD FOR SUGGESTING ACTIONS BASED UPON INCOMING MESSAGES

(71) Applicant: Nuance Communications, Inc., Burlington, MA (US)

(72) Inventors: Daniel Willett, Walluf (DE); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 262 days.

(21) Appl. No.: 15/321,328

(22) PCT Filed: Jul. 3, 2014

(86) PCT No.: PCT/US2014/045395
§ 371 (c)(1),
(2) Date: Dec. 22, 2016

(87) PCT Pub. No.: WO2016/003469
PCT Pub. Date: Jan. 7, 2016

(65) Prior Publication Data
US 2017/0149703 A1    May 25, 2017

(51) Int. Cl.
*G06F 15/16*    (2006.01)
*H04L 12/58*    (2006.01)
*H04W 4/21*    (2018.01)
*H04W 4/12*    (2009.01)
*G06F 40/30*    (2020.01)
*G06F 3/0482*    (2013.01)
(Continued)

(52) U.S. Cl.
CPC .......... *H04L 51/043* (2013.01); *G06F 3/0482* (2013.01); *G06F 40/30* (2020.01); *H04L 51/08* (2013.01); *H04L 51/24* (2013.01); *H04W 4/12* (2013.01); *H04W 4/14* (2013.01); *H04W 4/21* (2018.02); *H04L 67/20* (2013.01)

(58) Field of Classification Search
CPC . G06F 17/2785; G06F 3/0482; H04L 51/043; H04L 51/08; H04L 51/24; H04L 67/20; H04W 4/12; H04W 4/14; H04W 4/21
USPC ......................................... 709/205, 206, 217
See application file for complete search history.

(56) References Cited

U.S. PATENT DOCUMENTS 7,412,260 B2 * 8/2008 Gailey ................ G06F 17/3043
455/563
7,853,551 B1    12/2010 Gill
2005/0267865 A1 * 12/2005 Bird .................. G06F 16/24534
(Continued)

OTHER PUBLICATIONS

International Search Report and Written Opinion issued in counterpart PCT Application Serial Appl. No. PCT/US2014/045395, filed on Jul. 3, 2014.
(Continued)

*Primary Examiner* — Liang Che A Wang
(74) *Attorney, Agent, or Firm* — Brian J. Colandreo; Michael T. Abramson; Holland & Knight LLP

(57) ABSTRACT

A method in accordance with the present disclosure may include receiving a message at a mobile computing device and performing natural language processing (NLP) based interpretation of the message. Embodiments may further include suggesting at least one of an action and an application configured to perform the action, the suggestion based upon, at least in part, the NLP-based interpretation of the message.

18 Claims, 15 Drawing Sheets

(51) Int. Cl.
*H04W 4/14* (2009.01)
*H04L 29/08* (2006.01)

(56) References Cited

U.S. PATENT DOCUMENTS

| | | | | |
|---|---|---|---|---|
| 2006/0290965 | A1* | 12/2006 | Sugai | G06F 3/1204 358/1.13 |
| 2007/0286181 | A1 | 12/2007 | Bushmitch | |
| 2008/0036586 | A1 | 2/2008 | Ohki | |
| 2009/0258630 | A1* | 10/2009 | Purohit | H04M 15/00 455/406 |
| 2010/0017194 | A1* | 1/2010 | Hammer | G06F 17/2785 704/9 |
| 2011/0022610 | A1* | 1/2011 | Simon | G06Q 10/107 707/755 |
| 2012/0042000 | A1* | 2/2012 | Heins | G06Q 10/10 709/201 |
| 2013/0054863 | A1* | 2/2013 | Imes | H04L 12/2827 710/304 |
| 2014/0149582 | A1* | 5/2014 | Chien | H04L 67/34 709/224 |
| 2014/0156386 | A1* | 6/2014 | Williams | G06Q 30/0203 705/14.44 |
| 2015/0082218 | A1* | 3/2015 | Affoneh | G06F 9/451 715/771 |
| 2015/0095322 | A1* | 4/2015 | Procopio | G06Q 30/0631 707/723 |
| 2015/0205782 | A1* | 7/2015 | Subramanya | G06Q 10/107 704/9 |
| 2015/0207766 | A1* | 7/2015 | Lindner | H04L 51/06 709/206 |
| 2015/0278972 | A1* | 10/2015 | McGuire | G06Q 50/18 705/26.63 |
| 2015/0378646 | A1* | 12/2015 | James | G06F 3/126 358/1.15 |

OTHER PUBLICATIONS

Examination report from related European Application No. 14742691.0, dated Aug. 27, 2019 (4 pages).

* cited by examiner

SYSTEM AND METHOD FOR SUGGESTING ACTIONS BASED UPON INCOMING MESSAGES

RELATED APPLICATIONS

The subject application is a U.S. National Stage Application of International Application No. PCT/US2014/045395, filed on Jul. 3, 2014, the contents of which are herein incorporated by reference in its entirety.

TECHNICAL FIELD

This disclosure relates to a method for suggesting actions and, more particularly, to a method of suggesting actions or applications based upon a received message associated with a mobile device.

BACKGROUND

Mobile devices often send and receive messages that deal with arranging calls and meetings as well as setting reminders. Some of these may include, but are not limited to, short message service ("SMS"), multimedia message service ("MMS"), email, instant messages or even text messages generated by voicemail to text applications. As long as the messages are not overly complex, automatic semantic interpretation is rather straight forward.

SUMMARY OF DISCLOSURE

In one implementation, a method, in accordance with this disclosure, may include receiving a message at a mobile computing device and performing natural language processing (NLP) based interpretation of the message. Embodiments may further include suggesting at least one of an action and an application configured to perform the action, the suggestion based upon, at least in part, the NLP-based interpretation of the message.

One or more of the following features may be included. In some embodiments, the message may be one or more of an MMS message, an SMS message, an instant message, and an email message. The NLP-based interpretation may be performed on the mobile computing device. The NLP-based interpretation may be performed on a server that is communication with the mobile computing device. The suggestion may be performed audibly via a virtual assistant associated with the mobile computing device. At least one of performing and suggesting may be automatically triggered upon receipt of the message. The method may include activating the application in response to receiving user acceptance of the suggestion. The method may further include activating the application automatically without requiring user acceptance of the suggestion. The method may also include connecting the mobile computing device with a third party server. The suggestion may be displayed on a graphical user interface associated with the mobile computing device. The method may further include allowing a user to set a preference associated with the suggestion.

In another implementation, a computer program product residing on a computer readable storage medium having a plurality of instructions stored thereon is provided. In some embodiments, the instructions, which when executed by a processor, cause the processor to perform one or more operations. Some operations may include receiving a message at a mobile computing device and performing natural language processing (NLP) based interpretation of the message. Embodiments may further include suggesting at least one of an action and an application configured to perform the action, the suggestion based upon, at least in part, the NLP-based interpretation of the message.

One or more of the following features may be included. In some embodiments, the message may be one or more of an MMS message, an SMS message, an instant message, and an email message. The NLP-based interpretation may be performed on the mobile computing device. The NLP-based interpretation may be performed on a server that is communication with the mobile computing device. The suggestion may be performed audibly via a virtual assistant associated with the mobile computing device.

In another implementation, a computing system is provided. In some embodiments, the computing system may include one or more processors configured to receive a message at a mobile computing device. The one or more processors may be further configured to perform natural language processing (NLP) based interpretation of the message. The one or more processors may be further configured to suggest at least one of an action and an application configured to perform the action, the suggestion based upon, at least in part, the NLP-based interpretation of the message.

One or more of the following features may be included. In some embodiments, at least one of performing and suggesting may be automatically triggered upon receipt of the message. The method may include activating the application in response to receiving user acceptance of the suggestion. The method may further include activating the application automatically without requiring user acceptance of the suggestion.

The details of one or more implementations are set forth in the accompanying drawings and the description below. Other features and advantages will become apparent from the description, the drawings, and the claims.

DETAILED DESCRIPTION OF THE EMBODIMENTS

Referring to FIGS. 1-13, there is shown a suggestion process 10 that may reside on and may be executed by computer 12, which may be connected to network 14 (e.g., the Internet or a local area network). Server application 20 may include some or all of the elements of identification process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, or a computing cloud. The various components of computer 12 may execute one or more operating systems, examples of which may include but are not limited to: Microsoft Windows Server™; Novell Netware™; Redhat Linux™, Unix, or a custom operating system, for example.

Figure 1:
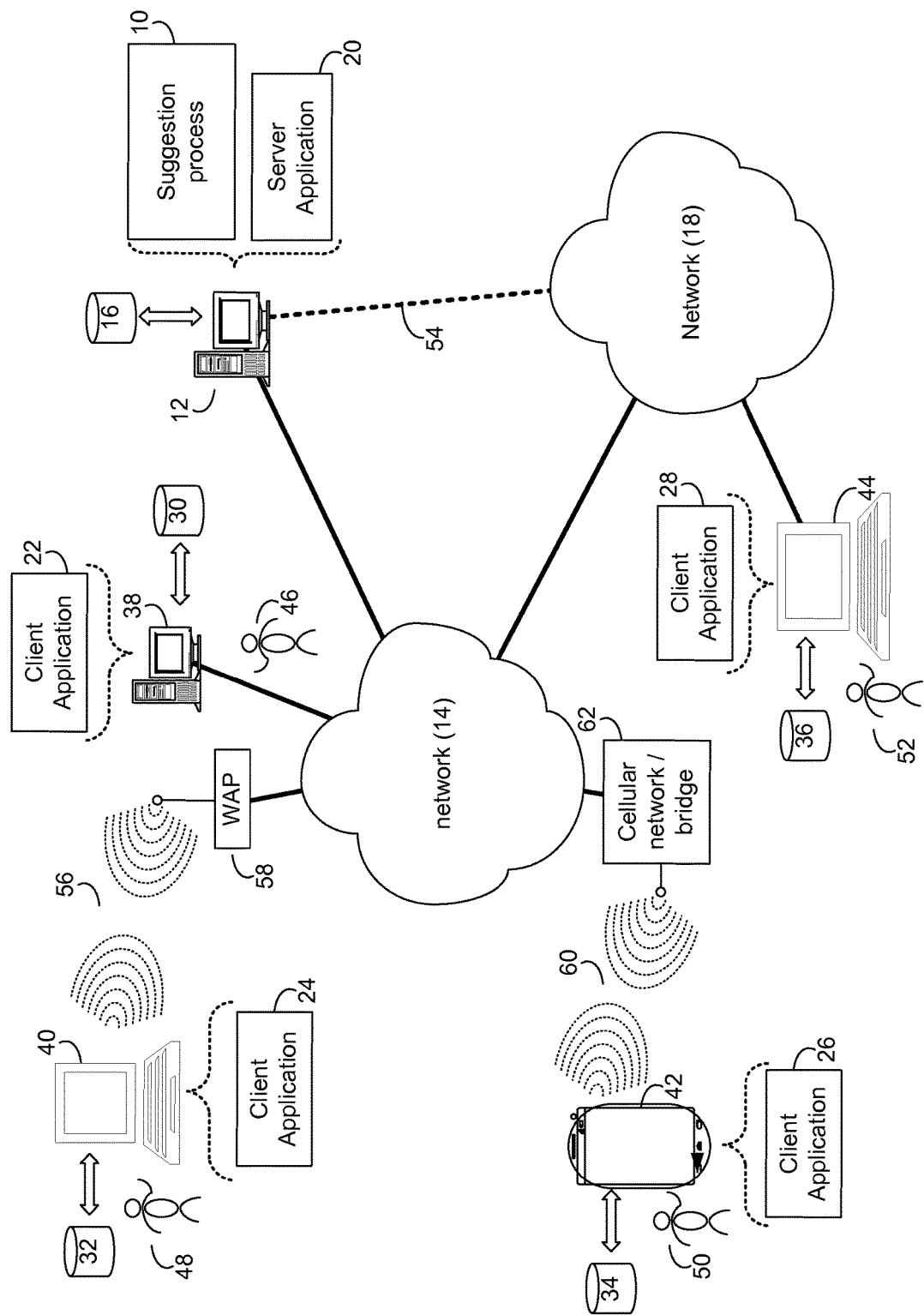
FIG. 1 is a diagrammatic view of a suggestion process in accordance with an embodiment of the present disclosure.
Figure 2:
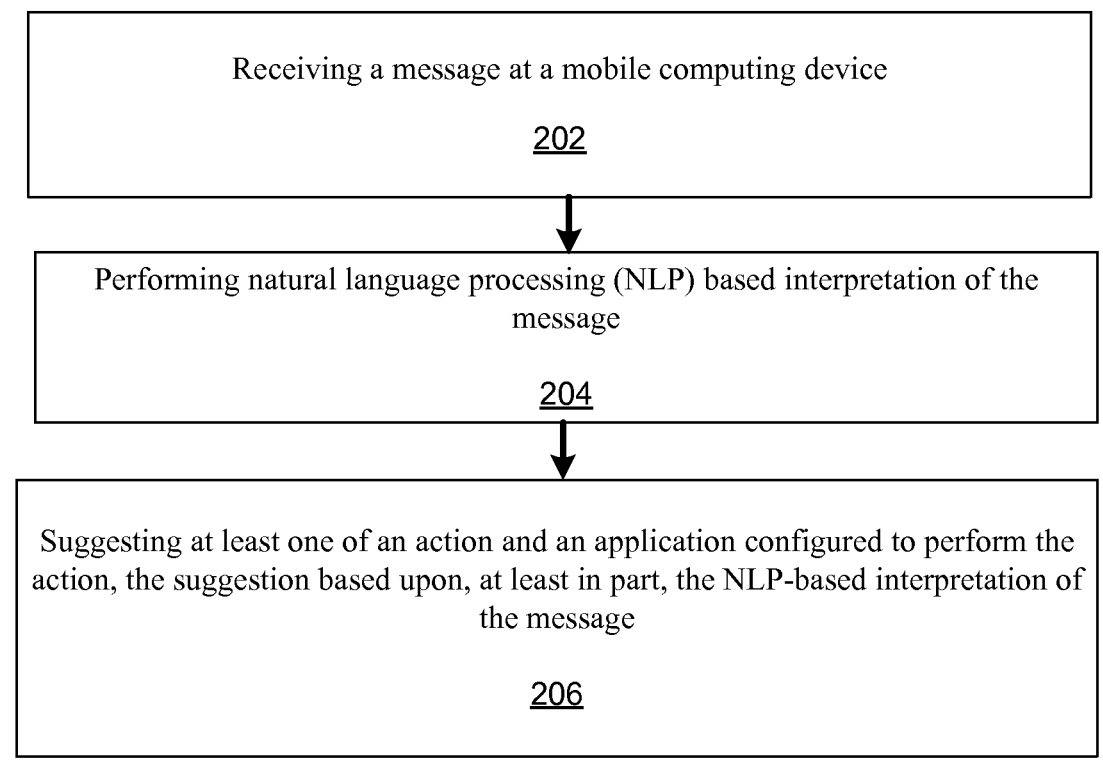
FIG. 2 is a flowchart of the suggestion process of FIG. 1 in accordance with an embodiment of the present disclosure.

With reference to FIG. 2, and as will be discussed below in greater detail, suggestion process 10 may include receiving (202) a message at a mobile computing device and performing (204) natural language processing (NLP) based interpretation of the message. Embodiments may further include suggesting (206) at least one of an action and an application configured to perform the action, the suggestion based upon, at least in part, the NLP-based interpretation of the message. Numerous additional operations are also within the scope of the present disclosure as are discussed in further detail herein below.

Referring back to FIG. 1, the instruction sets and subroutines of suggestion process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Suggestion process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet computer (not shown), a server (not shown), a data-enabled, cellular telephone (not shown), a television with one or more processors embedded therein or coupled thereto, and a dedicated network device (not shown).

One or more of client applications 22, 24, 26, 28 may be configured to effectuate some or all of the functionality of suggestion process 10. Accordingly, suggestion process 10 may be a purely server-side application, a purely client-side application, or a hybrid server-side/client-side application that is cooperatively executed by one or more of client applications 22, 24, 26, 28 and suggestion process 10.

Users 46, 48, 50, 52 may access computer 12 and suggestion process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking or messaging service. For example, the client devices 38, 40, 42, 44 may execute web browser applications that can be used to access the social networking or messaging service. In another example, the client devices 38, 40, 42, 44 may execute software applications that are specific to the social network or messaging service (e.g., social networking or messaging "apps" running on smartphones).

Embodiments of suggestion process 10 may provide a mechanism that facilitates taking actions based on incoming messages on mobile devices. The term "message" as used herein may refer to any messaging type, some of which may include, but are not limited to, email, text, SMS, MMS, instant, etc. The phrases "natural language" and "natural language processing" as used herein, encompass their ordinary meaning and generally include natural language understanding, which may enable computing devices to derive meaning from human input. Additional information regarding natural language processing may be found, for example, in U.S. Pat. No. 7,835,911, available from the Assignee of the present disclosure.

Embodiments of suggestion process 10 may be used to direct mobile device users to third-party service providers and may help to facilitate user interaction with virtual assistants available through the user's mobile device (e.g. Dragon Mobile Assistant available from the Assignee of the present disclosure). Accordingly, suggestion process 10 may be configured to provide full NLP-based text interpretation and suggestion of full actions and/or applications based upon the received message. The phrase "NLP" as used herein, may refer to its ordinary meaning as well as to any form of text parsing, which may include pure keyword and phrase matching techniques.

Embodiments of suggestion process 10 may provide for the semantic interpretation of incoming messages on mobile devices, which may then automatically trigger interaction with the user suggesting taking action. As discussed above, this semantic interpretation may occur on the mobile device itself or in the cloud or in hybrid scenarios. In some embodiments, the features associated with suggestion process 10 may be manually adjustable by users or may adapt seamlessly to user behavior. In some embodiments, stochastic or rule-based NLP approaches could be applied or combined as well. For messages received from voice mail-to-text services, the semantic interpretation may include recognition and transcription confidence as well as recognition output beyond 1-best (e.g., lattice, nbest etc.) into consideration.

Figure 3:
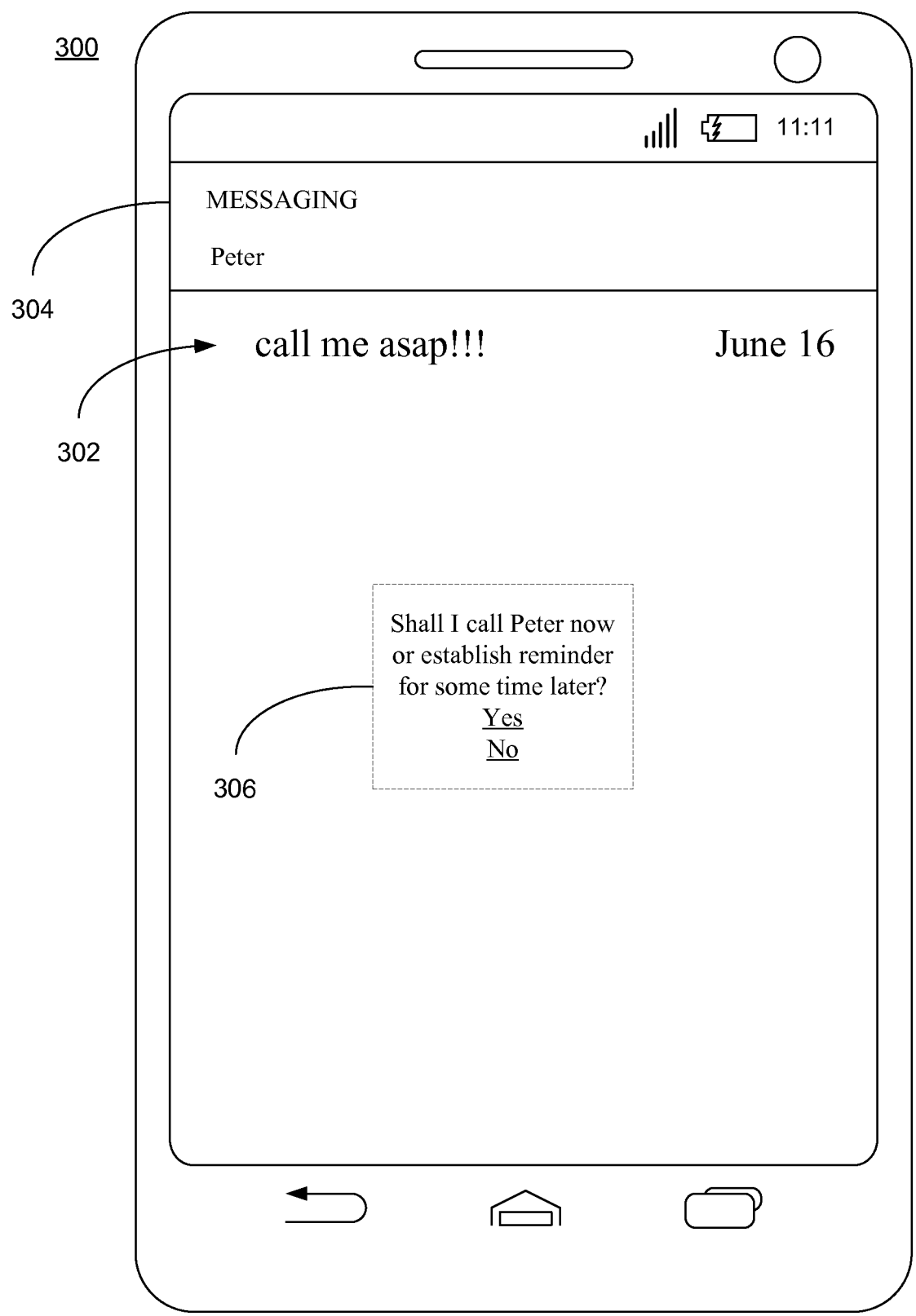
FIG. 3 is a diagrammatic view of an interface rendered by the suggestion process in accordance with an embodiment of the present disclosure.

Referring now to FIG. 3 an embodiment depicting a mobile computing device 300 configured to implement suggestion process 10 is provided. In this particular embodiment, a message 302 has been received within a text messaging application 304 associated with the mobile computing device 300. Upon receipt of the text message, suggestion process 10 may be configured to automatically perform an NLP based interpretation of the message. In this particular embodiment, the message ("call me asap!!!") has been received from a mobile number known to the user (e.g. message from Peter). Suggestion process 10 may then suggest an action or an application configured to perform the action to the user. For example, in this case suggestion process 10 may automatically invoke the messaging application 304 as shown in FIG. 3. Additionally and/or alternatively, in some embodiments suggestion process 10 may automatically invoke a virtual assistant, which may then audibly ask the user "shall I call Peter now or establish reminder for some time later?" In some embodiments, suggestion process 10 may provided a display 306 that is configured to provide the question to the user in text-based form. This option may be provided in addition to the audible question or alternatively may replace the audible question at the user's option. As discussed herein, some or all of suggestion process 10 may be implemented using any type of device, for example, via server computing device 12 shown in FIG. 1 and/or using a mobile computing device such as those shown in FIGS. 3-13.

Figure 4:
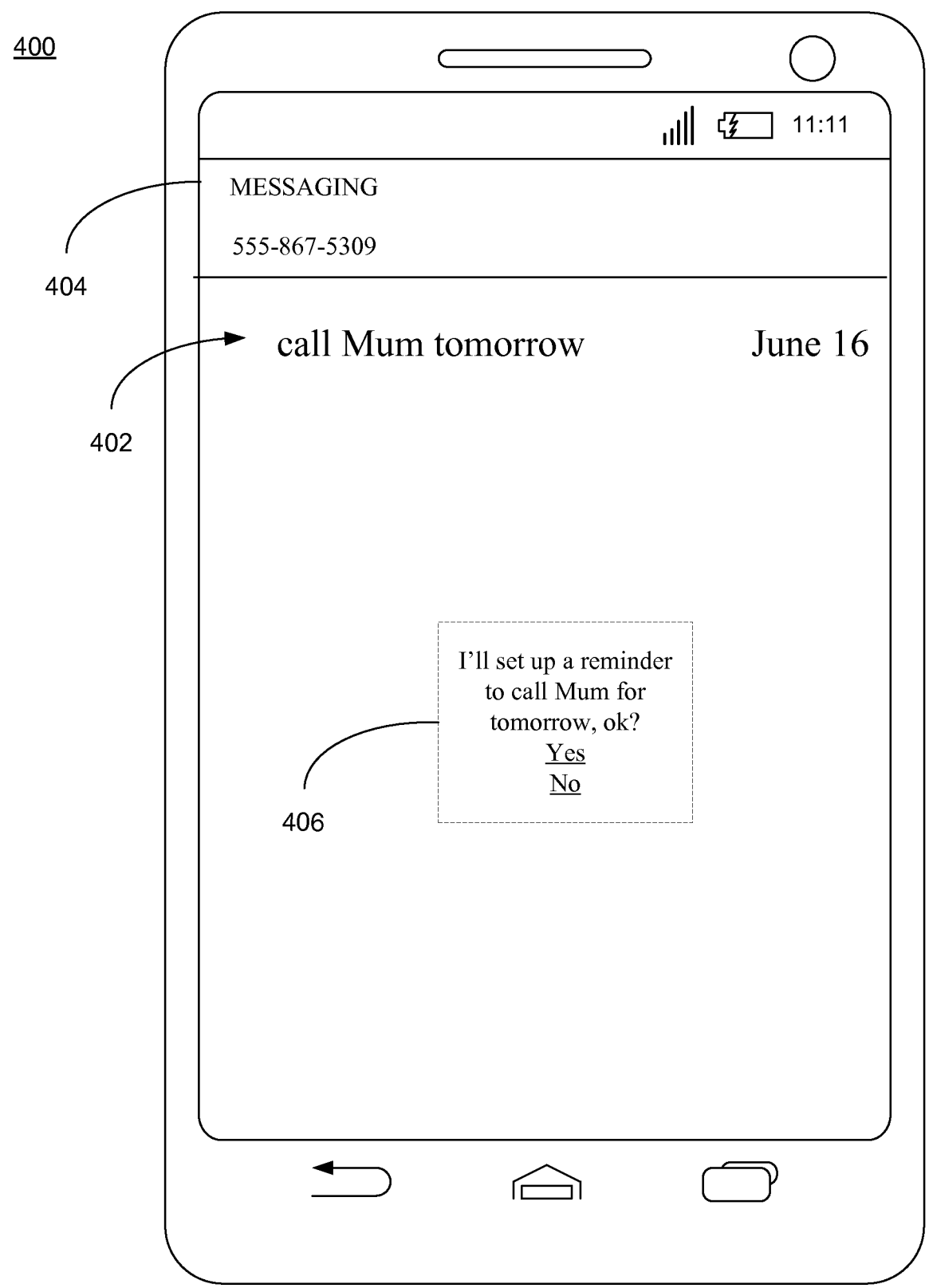
FIG. 4 is a diagrammatic view of an interface rendered by the suggestion process in accordance with an embodiment of the present disclosure.

Referring now to FIG. 4 an embodiment depicting a mobile computing device 300 configured to implement suggestion process 10 is provided. In this particular embodiment, a message 402 has been received within a text messaging application 304 associated with the mobile computing device 400. Upon receipt of the text message, suggestion process 10 may be configured to automatically perform an NLP based interpretation of the message. In this particular embodiment, the message ("call Mum tomorrow") has been received. Suggestion process 10 may then suggest an action or an application configured to perform the action to the user. For example, in this case the virtual assistant may audibly ask the user "I'll set up a reminder to call Mum for tomorrow, ok"?

Figure 5:
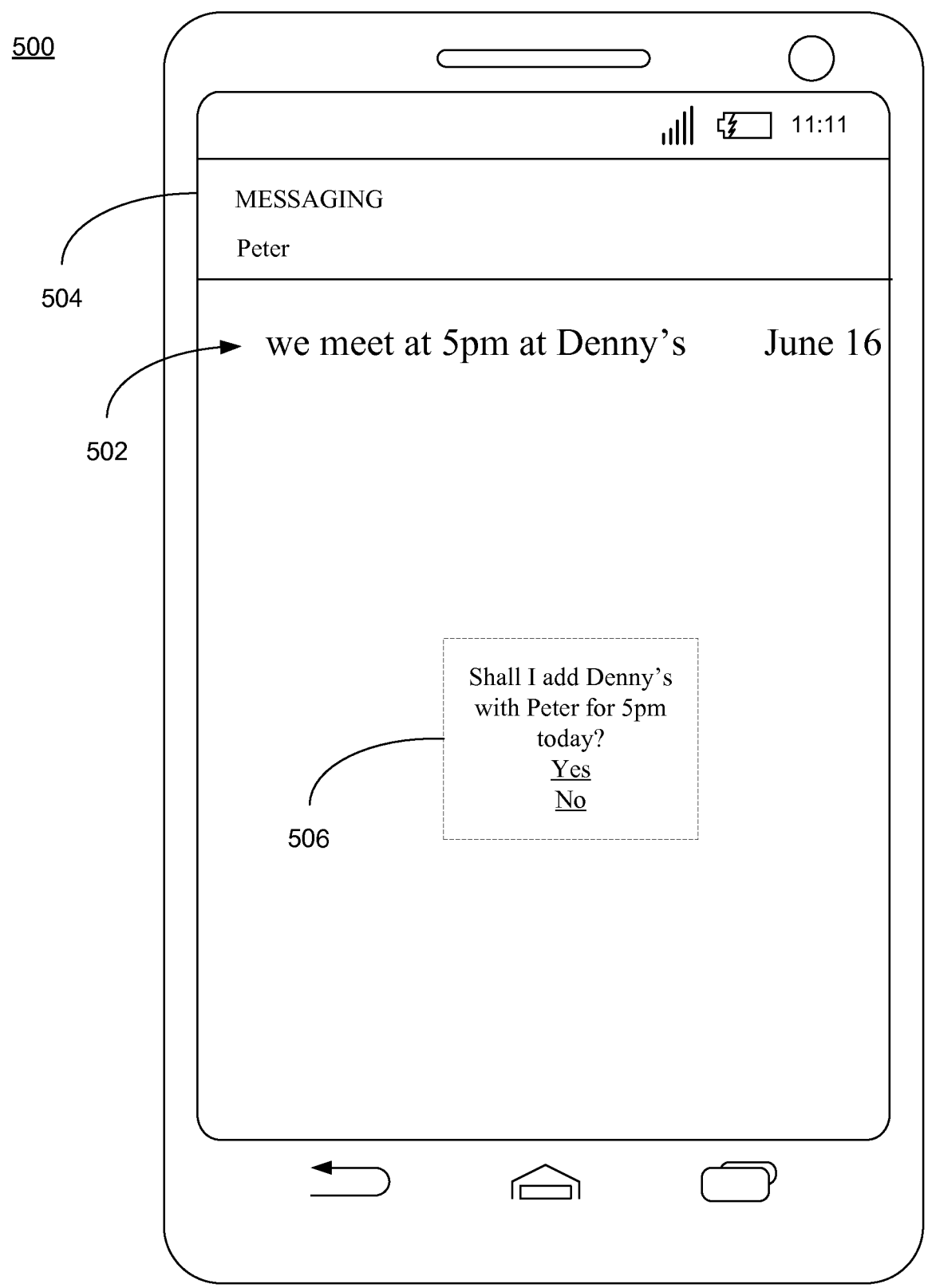
FIG. 5 is a diagrammatic view of an interface rendered by the suggestion process in accordance with an embodiment of the present disclosure.

Referring now to FIG. 5 an embodiment depicting a mobile computing device 500 configured to implement suggestion process 10 is provided. In this particular embodiment, a message 502 has been received within a text messaging application 504 associated with the mobile computing device 500. Upon receipt of the text message, suggestion process 10 may be configured to automatically perform an NLP based interpretation of the message. In this particular embodiment, the message ("we meet at 5 pm at Denny's") has been received from a mobile number known to the user (e.g. message from Peter). In this particular example, the virtual assistant may audibly ask the user "shall I add Denny's with Peter for 5 pm today"?

Figure 6:
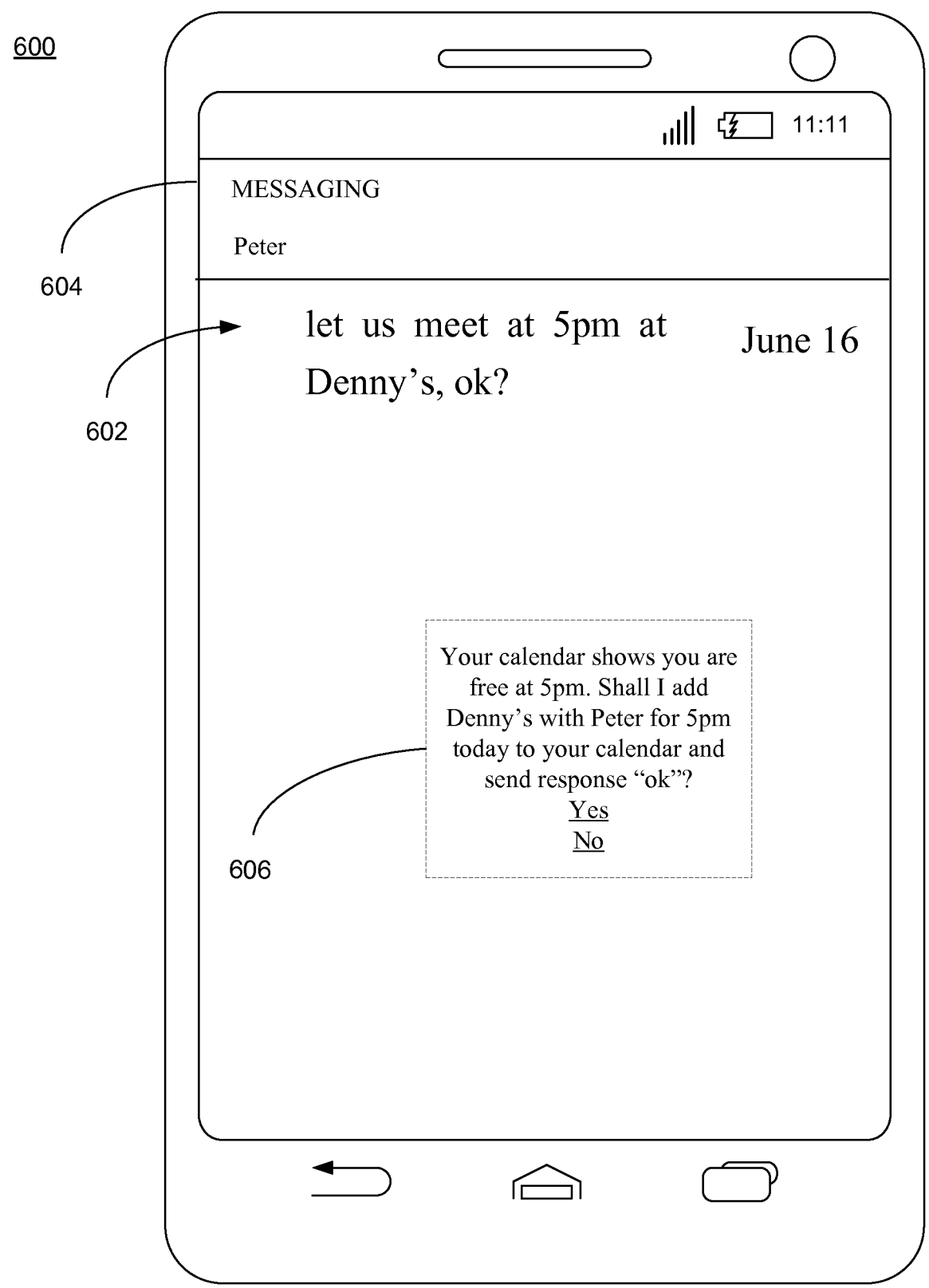
FIG. 6 is a diagrammatic view of an interface rendered by the suggestion process in accordance with an embodiment of the present disclosure.

Referring now to FIG. 6 an embodiment depicting a mobile computing device 600 configured to implement suggestion process 10 is provided. In this particular embodiment, a message 602 has been received within a text messaging application 604 associated with the mobile computing device 600. Upon receipt of the text message, suggestion process 10 may be configured to automatically perform an NLP based interpretation of the message. In this particular embodiment, the message ("let us meet at 5 pm at Denny's, ok?") has been received from a mobile number known to the user (e.g. message from Peter). In this particular example, the virtual assistant may audibly ask the user "Your calendar shows you are free at 5 pm. Shall I add Denny's with Peter for 5 pm today to your calendar and send response "ok"?

Figure 7:
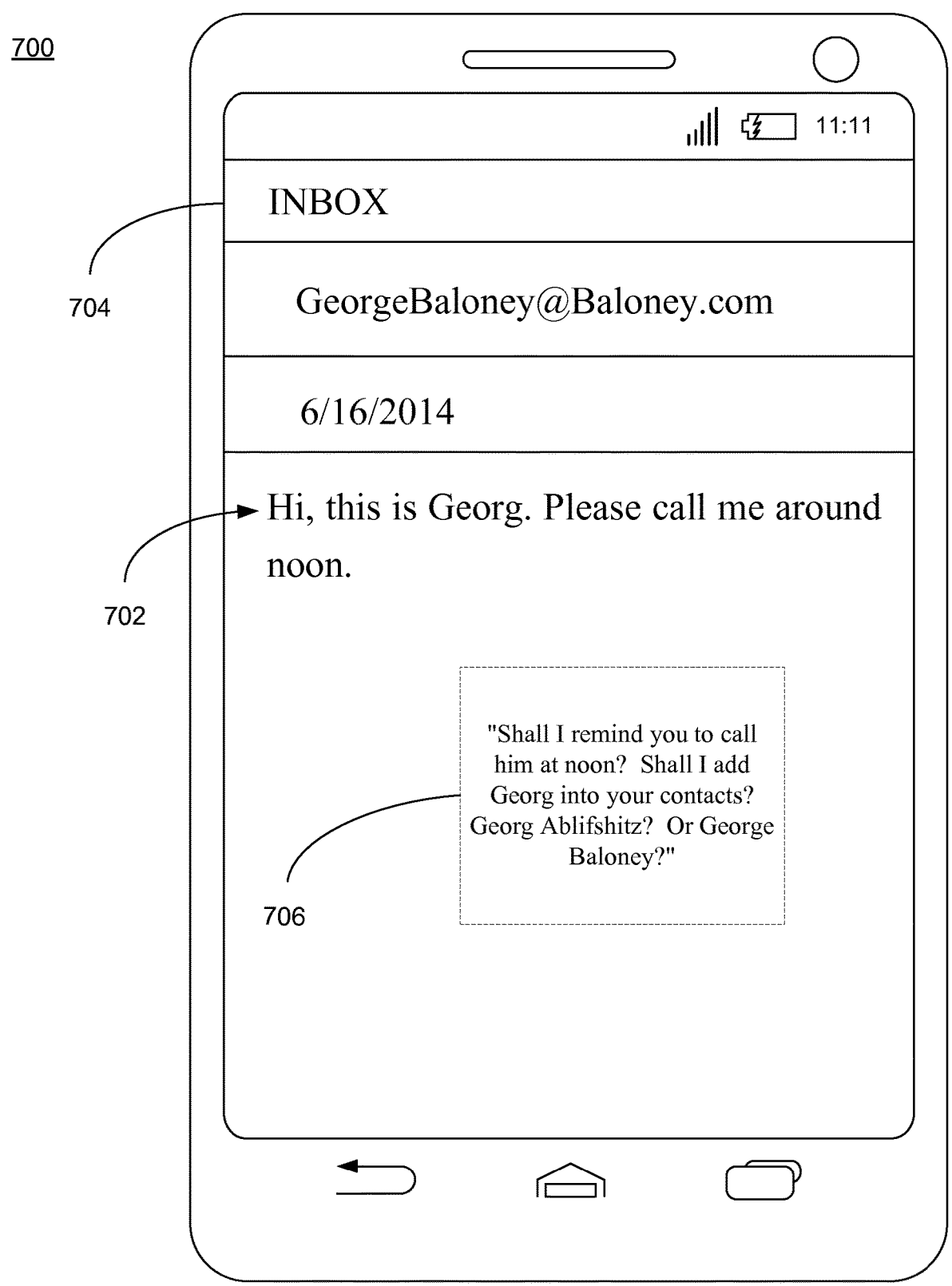
FIG. 7 is a diagrammatic view of an interface rendered by the suggestion process in accordance with an embodiment of the present disclosure.

Referring now to FIG. 7 an embodiment depicting a mobile computing device 700 configured to implement suggestion process 10 is provided. In this particular embodiment, a message 702 has been received within an email application 704 associated with the mobile computing device 700. Upon receipt of the email message, suggestion process 10 may be configured to automatically perform an NLP based interpretation of the message. In this particular embodiment, the message ("Hi, this is Georg. Please call me around noon") has been received from a mobile number not known to the user and not yet in the user's contact list. In this particular example, the virtual assistant may audibly ask the user "Shall I remind you to call him at noon? Shall I add Georg into your contacts? Georg Ablifshitz? Or George Baloney?"

Figure 8:
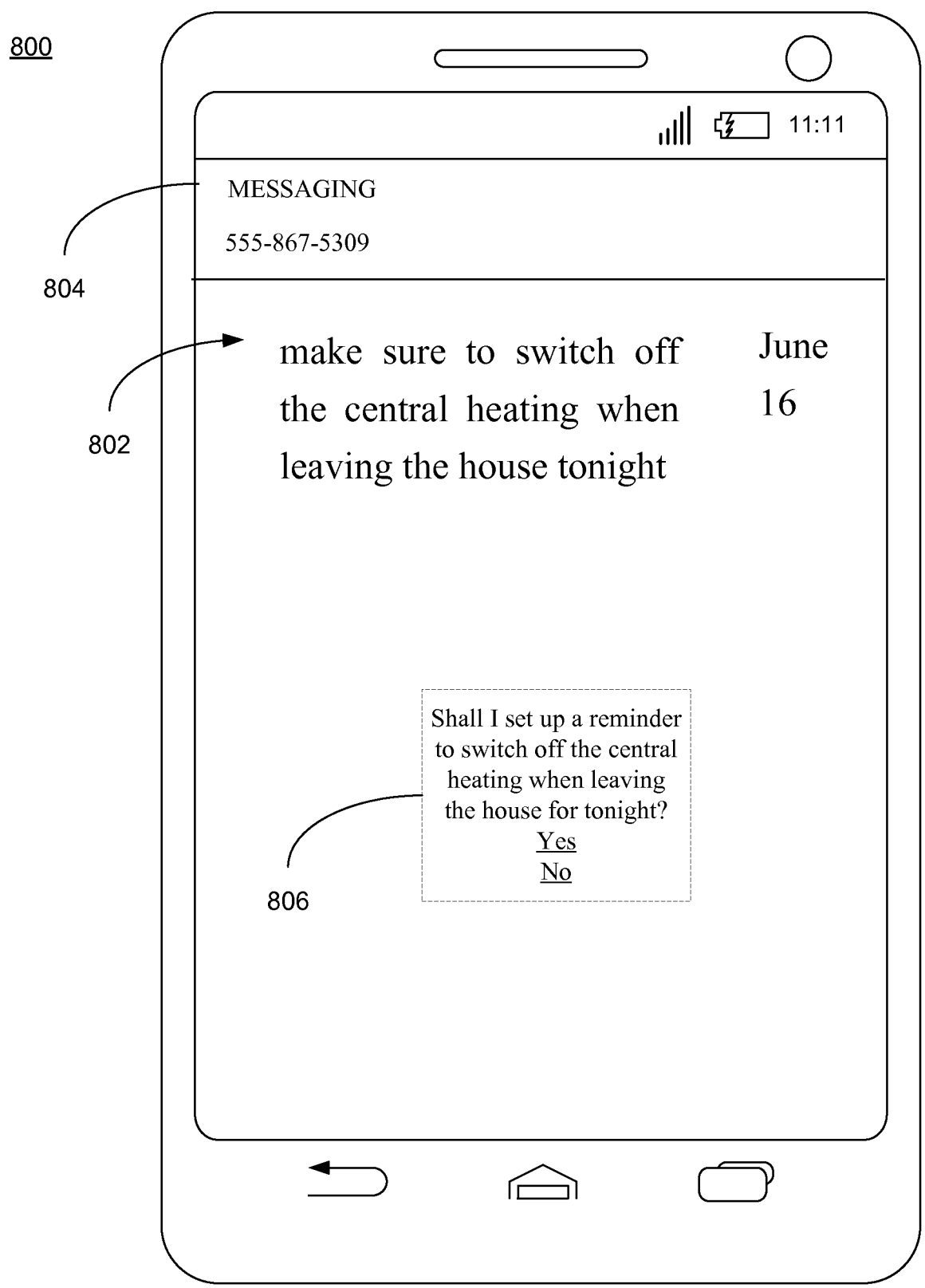
FIG. 8 is a diagrammatic view of an interface rendered by the suggestion process in accordance with an embodiment of the present disclosure.

Referring now to FIG. 8 an embodiment depicting a mobile computing device 800 configured to implement suggestion process 10 is provided. In this particular embodiment, a message 802 has been received within a text messaging application 804 associated with the mobile computing device 800. Upon receipt of the text message, suggestion process 10 may be configured to automatically perform an NLP based interpretation of the message. In this particular embodiment, the message ("make sure to switch off the central heating when leaving the house tonight") has been received. In this particular example, the virtual assistant may audibly ask the user "Shall I set up a reminder to switch off the central heating when leaving the house for tonight"?

Figure 9:
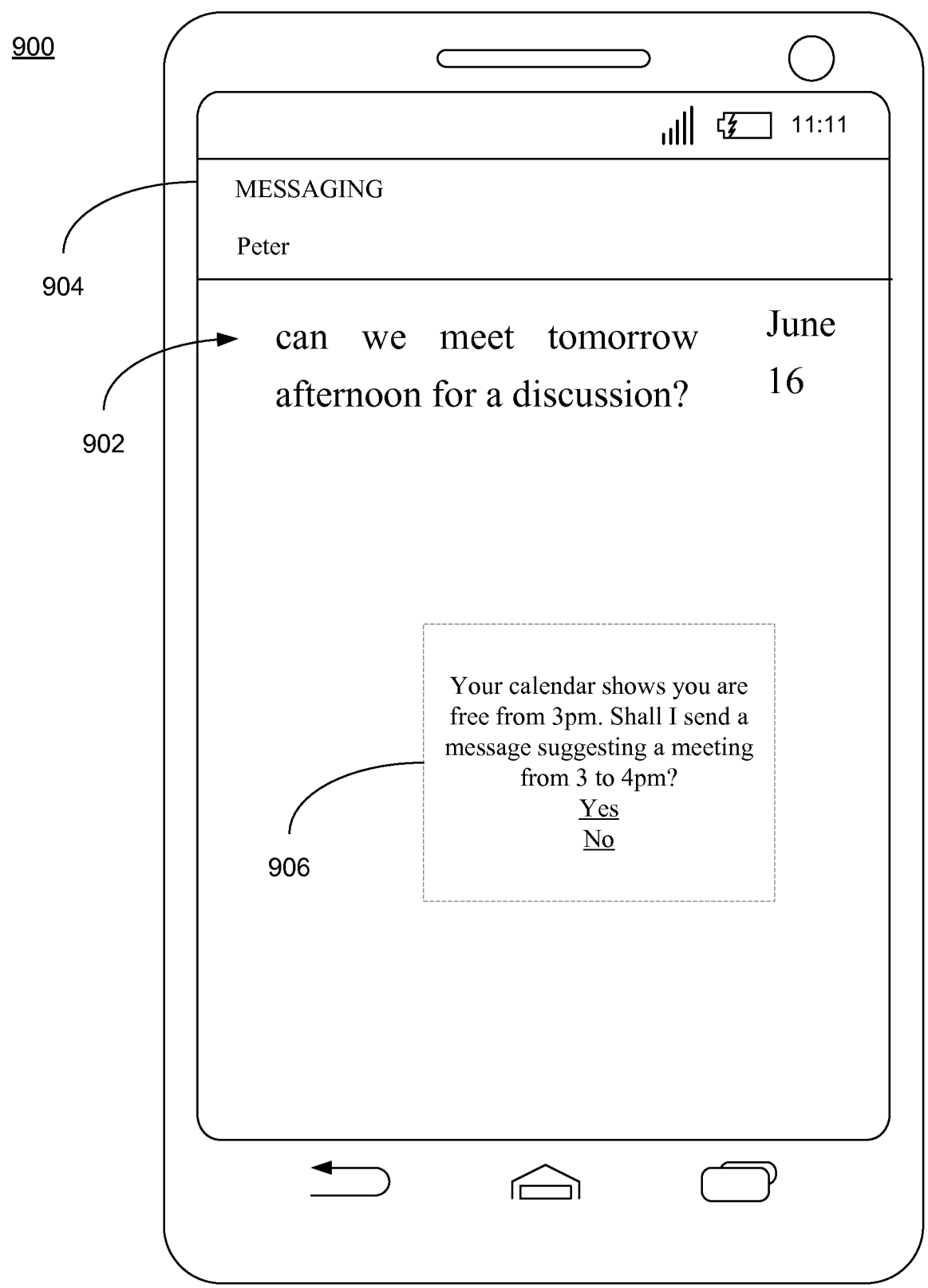
FIG. 9 is a diagrammatic view of an interface rendered by the suggestion process in accordance with an embodiment of the present disclosure.

Referring now to FIG. 9 an embodiment depicting a mobile computing device 300 configured to implement suggestion process 10 is provided. In this particular embodiment, a message 902 has been received within a text messaging application 304 associated with the mobile computing device 900. Upon receipt of the text message, suggestion process 10 may be configured to automatically perform an NLP based interpretation of the message. In this particular embodiment, the message ("can we meet tomorrow afternoon for a discussion?") has been received from a mobile number known to the user (e.g. message from Peter). In this particular example, the virtual assistant may audibly ask the user "Your calendar shows you are free from 3 pm. Shall I send a message suggesting a meeting from 3 to 4 pm"?

Figure 10:
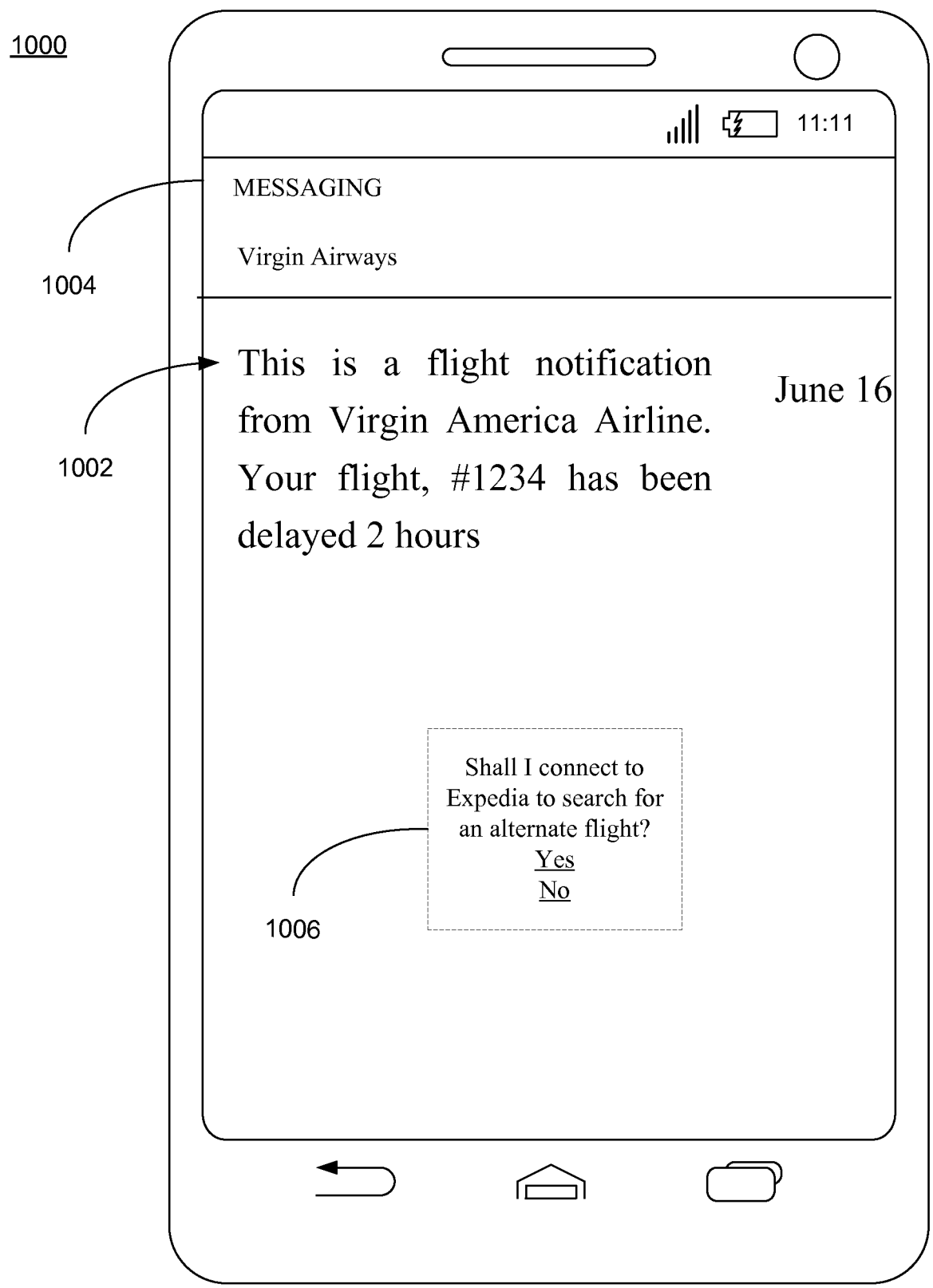
FIG. 10 is a diagrammatic view of an interface rendered by the suggestion process in accordance with an embodiment of the present disclosure.

Referring now to FIG. 10 an embodiment depicting a mobile computing device 1000 configured to implement suggestion process 10 is provided. In this particular embodiment, a message 1002 has been received within a text messaging application 1004 associated with the mobile computing device 1000. Upon receipt of the text message, suggestion process 10 may be configured to automatically perform an NLP based interpretation of the message. In this particular embodiment, the message ("This is a flight notification from Virgin America Airline. Your flight, #1234 has been delayed 2 hours" has been received from a third party server (in this example, Virgin America). In this particular example, the virtual assistant may audibly ask the user "Shall I connect to Expedia to search for an alternate flight?" Additionally and/or alternatively, suggestion process 10 may be configured to search a third party server automatically (e.g. without asking for the user's permission). In some embodiments, suggestion process 10 may be configured to search automatically and then ask the user whether or not they wish to view the results of the search. In this way, suggestion process 10 may be configured to perform low cost or low risk tasks without waiting for the user's permission but may require permission before performing higher cost or higher risk task (e.g., tasks that require payment from the user, bookings, etc.).

Figure 11:
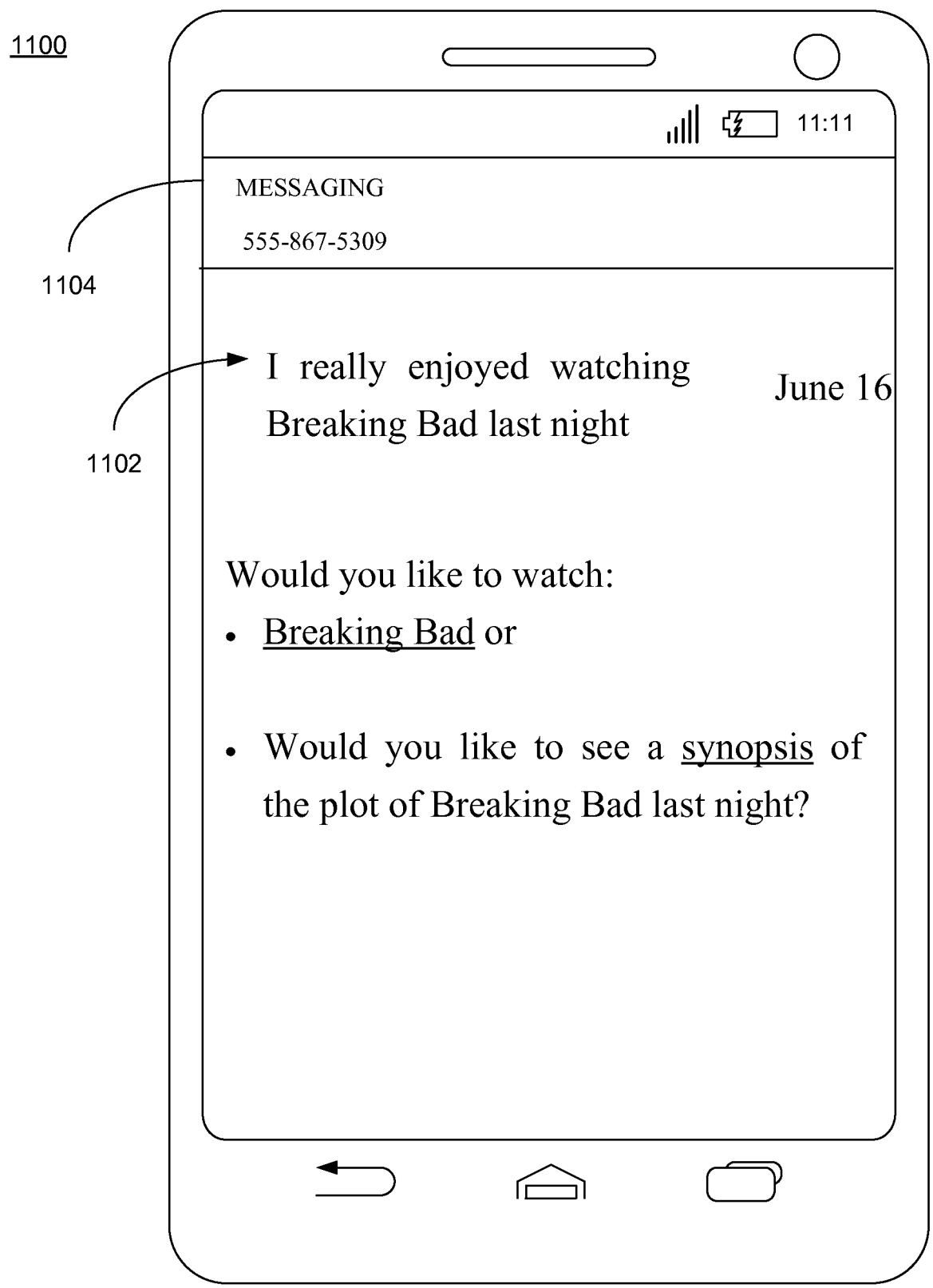
FIG. 11 is a diagrammatic view of an interface rendered by the suggestion process in accordance with an embodiment of the present disclosure.

Referring now to FIG. 11 an embodiment depicting a mobile computing device 1100 configured to implement suggestion process 10 is provided. In this particular embodiment, a message 1102 has been received within a text messaging application 1104 associated with the mobile computing device 1100. Upon receipt of the text message, suggestion process 10 may be configured to automatically perform an NLP based interpretation of the message. In this particular embodiment, the message ("I really enjoyed watching Breaking Bad last night") has been received from one of the user's contacts. In this particular example, the virtual assistant may visually ask the user via a graphical user interface associated with device 1100: "Would you like to watch it" and provide a link to a third party server (e.g. Netflix, etc.) for "Breaking Bad". Additionally and/or alternatively, the virtual assistant may provide a synopsis, for example, "Would you like to see a synopsis of the plot of Breaking Bad last night"?

Figure 12:
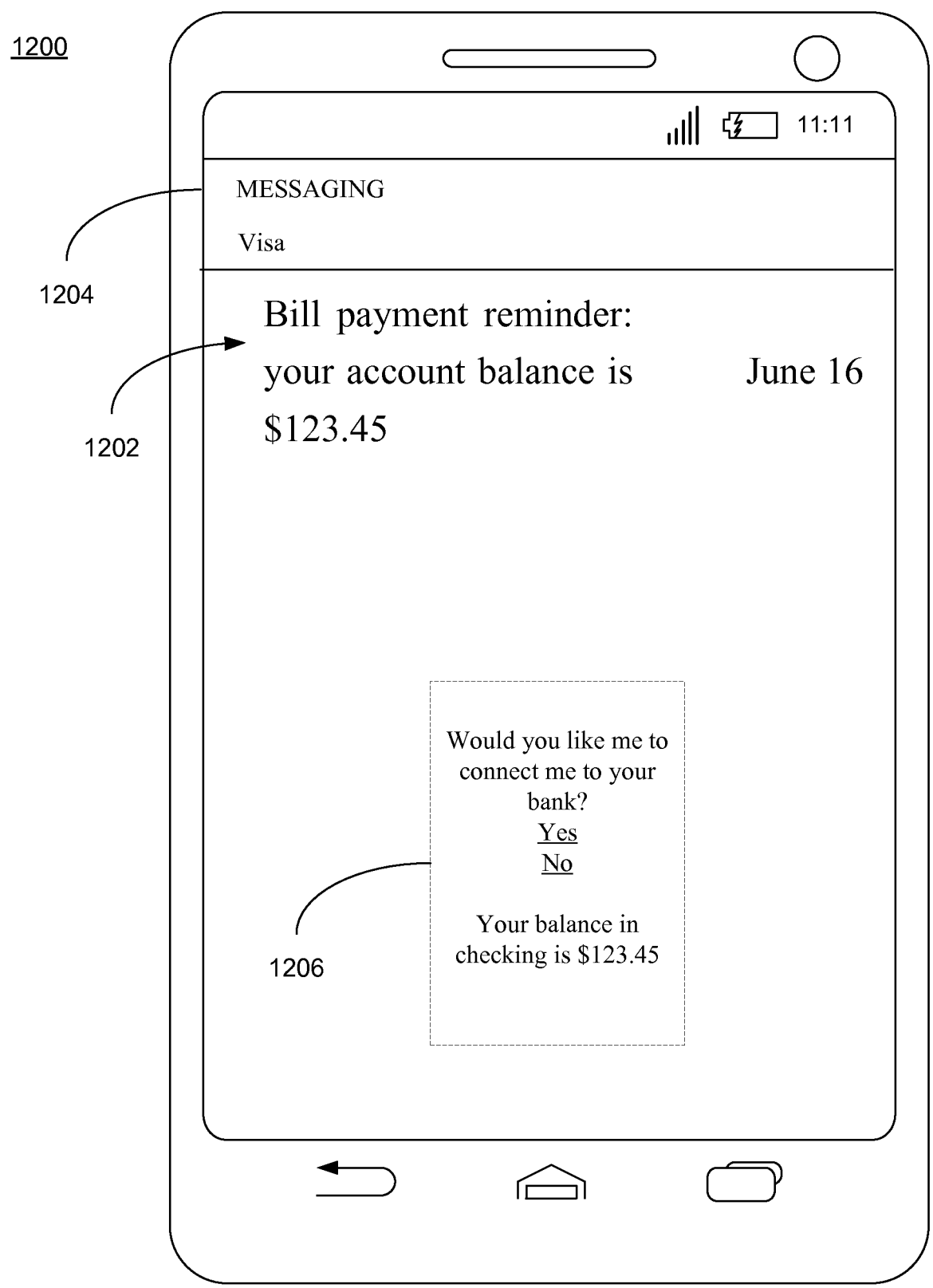
FIG. 12 is a diagrammatic view of an interface rendered by the suggestion process in accordance with an embodiment of the present disclosure.

Referring now to FIG. 12 an embodiment depicting a mobile computing device 1200 configured to implement suggestion process 10 is provided. In this particular embodiment, a message 1202 has been received within a text messaging application 1204 associated with the mobile computing device 1200. Upon receipt of the text message, suggestion process 10 may be configured to automatically perform an NLP based interpretation of the message. In this particular embodiment, the message ("Bill payment reminder: your account balance is"), is received from a third party server associated with Visa. In this particular example, the virtual assistant may audibly ask the user "would you like me to connect me to your bank? Your balance in checking is $123.45"

Figure 13:
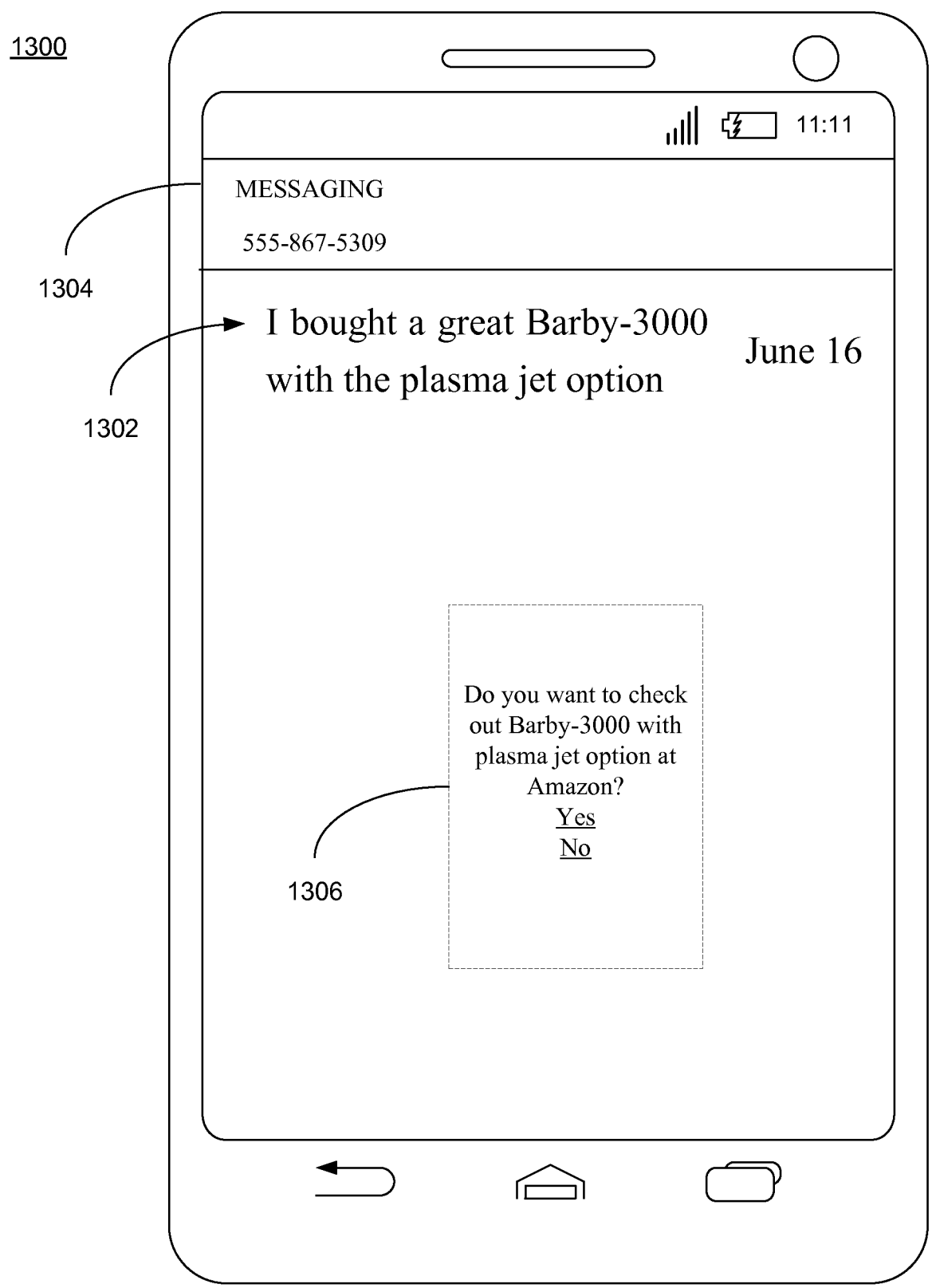
FIG. 13 is a diagrammatic view of an interface rendered by the suggestion process in accordance with an embodiment of the present disclosure.

Referring now to FIG. 13 an embodiment depicting a mobile computing device 1300 configured to implement suggestion process 10 is provided. In this particular embodiment, a message 1302 has been received within a text messaging application 1304 associated with the mobile computing device 1300. Upon receipt of the text message, suggestion process 10 may be configured to automatically perform an NLP based interpretation of the message. In this particular embodiment, the message ("I bought a great Barby-3000 with the plasma jet option") is received from a friend of the user. In this particular example, the virtual assistant may audibly suggest a shopping option. For example, "Do you want to check out Barby-3000 with plasma jet option at Amazon" or suggestions process 10 may provide a general suggestion around where to shop for toys.

Figure 14:
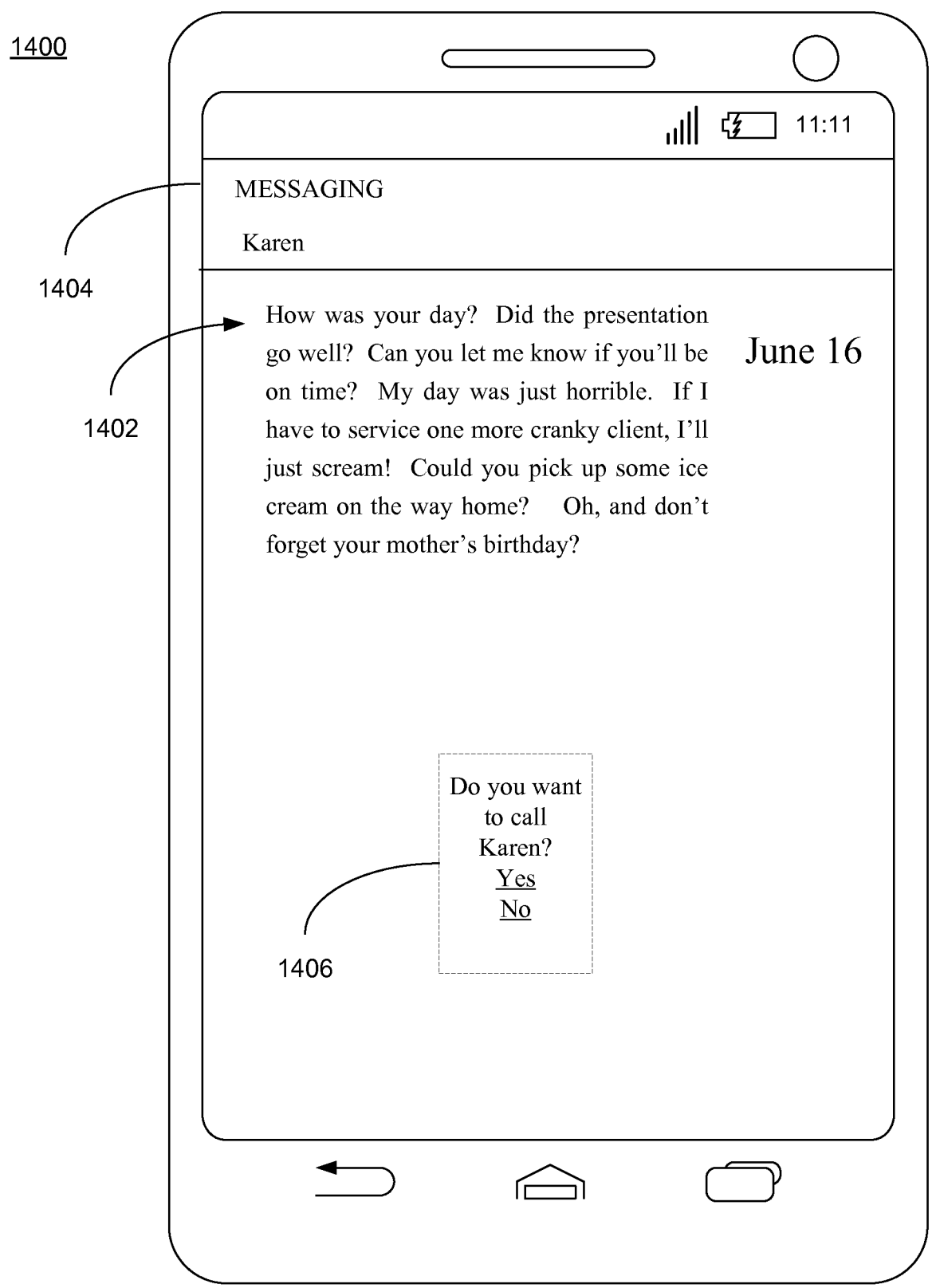
FIG. 14 is a diagrammatic view of an interface rendered by the suggestion process in accordance with an embodiment of the present disclosure.

Referring now to FIG. 14 an embodiment depicting a mobile computing device 1400 configured to implement suggestion process 10 is provided. In this particular embodiment, a lengthy message 1402 has been received within a text messaging application 1404 associated with the mobile computing device 1400. Upon receipt of the text message, suggestion process 10 may be configured to automatically perform an NLP based interpretation of the message. In this particular embodiment, the message ("How was your day? Did the presentation go well? Can you let me know if you'll be on time? My day was just horrible. If I have to service one more cranky client, I'll just scream! Could you pick up some ice cream on the way home? Oh, and don't forget your mother's birthday?") is received from the wife of the user (i.e. Karen). In this particular example, the virtual assistant may audibly ask the user if he would like to call his wife.

Figure 15:
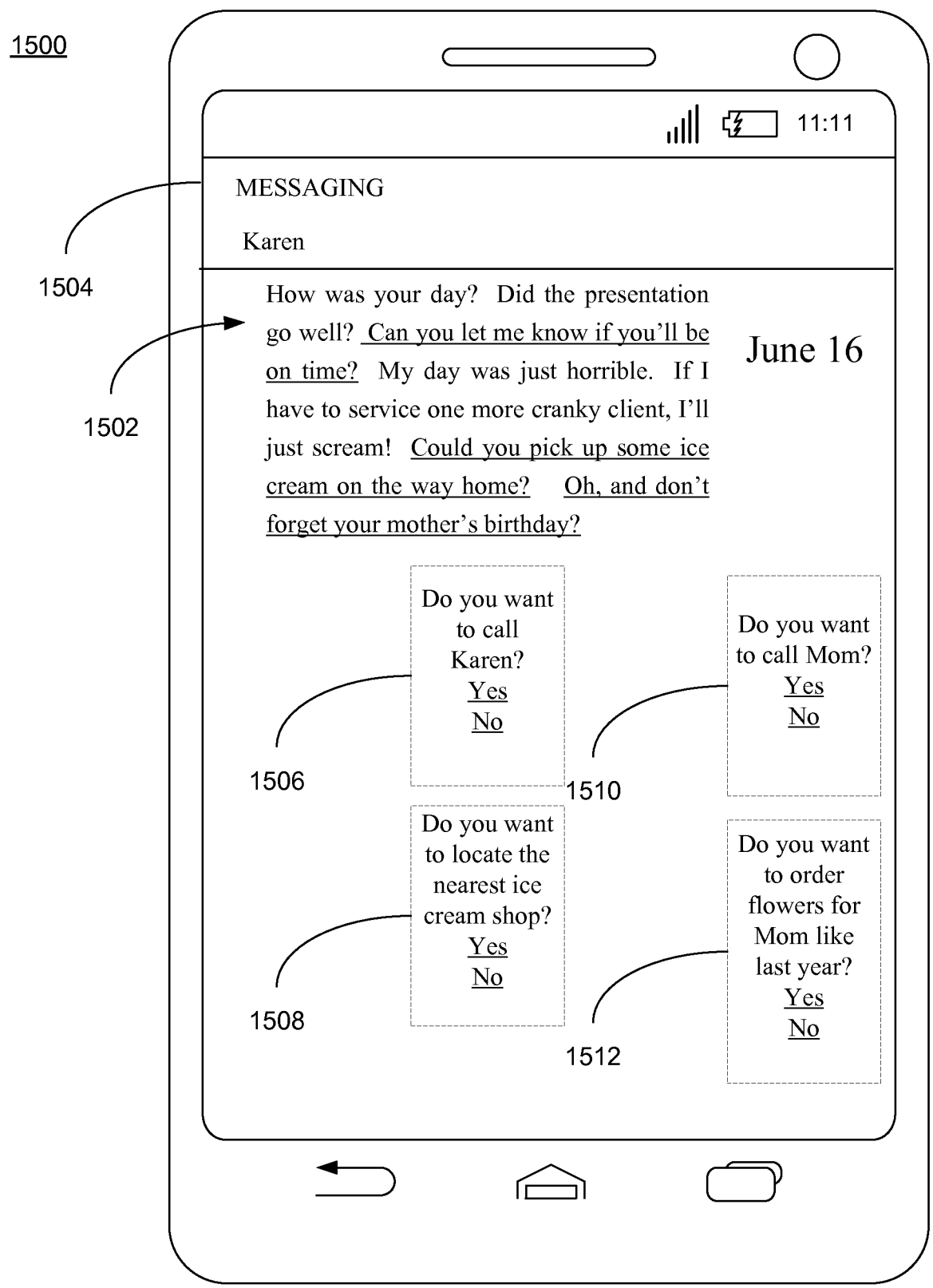
FIG. 15 is a diagrammatic view of an interface rendered by the suggestion process in accordance with an embodiment of the present disclosure Like reference symbols in the various drawings may indicate like elements.

Referring now to FIG. 15 an embodiment depicting a mobile computing device 1500 configured to implement suggestion process 10 is provided. In this particular embodiment, a lengthy message 1502 has been received within a text messaging application 1504 associated with the mobile computing device 1500. Upon receipt of the text message, suggestion process 10 may be configured to automatically perform an NLP based interpretation of the message. In this particular embodiment, the received message may include multiple commands that may be segmented, identified, and addressed via suggestion process 10. As shown in FIG. 15, suggestion process 10 may segment the text using any suitable approach (e.g. using sentence boundaries, punctuation marks, etc.). Accordingly, for each segment, suggestion process 10 may independently determine if it is, or is not, a command. Various displays 1506, 1508, 1510, and 1512 may be shown to the user, each corresponding to a particular command. As described above, the content of these displays may also be audibly provided to the user using the speakers associated with mobile computing device 1500. A limit may be set by the user on how many command may be processed and/or displays shown. In some cases, a particular sentence or segment of the received text may generate a plurality of displays (e.g. the phrase "Oh, and don't forget your mother's birthday?" could result in multiple suggestions, e.g. 1510 and 1512).

In some embodiments, suggestion process 10 may be configured to provide some form of visual output that may be associated with a graphical user interface of the mobile device. The interface may be configured to allow the user to insert the details (such as exact time) as well as giving confirmation by whatever means of input. Accordingly, the above examples identifying verbal system responses and actions are provided merely by way of example as numerous other configurations are also within the scope of the present disclosure.

In some embodiments, suggestion process 10 may generate an incoming text as a result of automatically transcribed audio (e.g. voicemail to text). Here, it should be noted that the semantic interpretation and offered actions may be based on nbest or lattice automatic speech recognition ("ASR") output. For example with an ASR output of "call Mum asap" and "call Mark asap" as the first and second choice, the system might generate a response such as "shall I call Mum or Mark right now?"

In some embodiments, suggestion process 10 may be configured to provide one or more formatting options. Some of these may include, but are not limited to spelling correction and text formatting options. In some cases, these options may be applied before attempting semantic interpretation.

In some embodiments, suggestion process 10 may be configured to prioritize certain types of messages over others. For example, text messages may be prioritized over email messages. These settings may be user-configurable or may be set by default. Additionally and/or alternatively, in some embodiments suggestion process 10 may be configured to pre-screen the message to identify whether it has been sent by a known contact. If so, the suggestion may be presented audibly, for example. If the received message is from an unknown contact or appears to be junkmail or spam suggestion process 10 may be configured to ignore the message, provide only a visual GUI-based suggestion, etc. Some or all of this may be user-configurable.

In some embodiments, suggestion process 10 may be configured to provide a link to one or more applications if the user chooses to accept one of the suggested actions or applications. For example, suggestion process 10 may provide one of these possible actions, which can be accessed by clicking a uniform resource locator ("URL"). In some cases, if the user selects the URL, the user may be directed to a page that relates to the action, but which also allows a download of an application.

In some embodiments, suggestion process 10 may be configured to connect the mobile computing device with a third party server, service provider, and/or application. Such suggestions could be subject of manual user preference settings, automatic user preference estimation and/or subject to contracts with the respective providers. Accordingly, suggestion process 10 may allow for advertisement options and options to link to certain contracted and/or favored vendors.

In some embodiments, suggestion process 10 may be configured to activate an application automatically (e.g. upon receipt of the message) without requiring user acceptance of the suggestion. Additionally and/or alternatively, suggestion process 10 may activate the application in response to receiving user acceptance of the suggestion. Performing the semantic interpretation of the message and/ or suggesting an action or application may occur automatically or upon a manual user indication. In this way, some or all of these options may be set at the user's convenience (e.g. certain preferences may be set by certain users for how to handle incoming messages and messaging types from other particular users).

In some embodiments, suggestion process 10 may be utilized in a hands-free environment. Some of these may include, but are not limited to, in-vehicle applications/ devices, smart home applications, and/or any suitable area that may utilize a processor or computing device, such as those shown in FIG. 1.

In some embodiments, suggestion process 10 may be configured to address one or more security concerns. For example, before an action is automatically triggered, suggestion process 10 may use a classification process in order to classify actions as being potential security risks. Some of these security concerns may include, but are not limited to, malicious messages and NLP failures, for example.

In some embodiments, suggestion process 10 may classify actions as being dangerous, moderately safe, and/or safe. These particular classifications are provided merely by way of example. Accordingly, actions classified as being dangerous may include a setting so that these actions are never performed automatically. Examples of dangerous actions may include, but are not limited to, deleting items, paying money, rebooting the phone, forwarding extensive information, following a url (except maybe for a safelist of urls), etc. Actions classified as being moderately safe may include a setting so that these actions are performed only when they are associated with trusted friends. Examples of moderately safe actions may include, but are not limited to, making appointments, acknowledging appointments, sending calendar info, following uniform resource locators ("urls") from a safelist, autoreplies, etc. Actions classified as being safe may include obtaining information from safe sources (e.g., Wikipedia, flight information, news outlets, certain third party servers, etc.). Some actions may be classified as safe even if they have been suggested by others. These settings may be altered according to the user's particular preferences.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving a message at a mobile computing device;
   performing natural language processing (NLP) based interpretation of the message via the mobile computing device;
   generating a suggestion of an action to be performed via an application of the mobile computing device, the action based upon, at least in part, the NLP-based interpretation of the message;
   providing the suggestion to a user of the mobile computing device for user acceptance based upon, at least in part, one or more user-configurable settings stored on computer storage set by the user receiving the message;
   receiving user acceptance of the suggestion of the action; and
   activating the application in response to receiving the user acceptance of the suggestion to enable the performance of the action via the application.

2. The computer-implemented method of claim 1, wherein the message is one or more of an MMS message, an SMS message, an instant message, and an email message.

3. The computer-implemented method of claim 1, wherein the NLP-based interpretation is performed on the mobile computing device.

4. The computer-implemented method of claim 1, wherein the NLP-based interpretation is performed on a server that is in communication with the mobile computing device.

5. The computer-implemented method of claim 1, wherein the suggestion is performed audibly via a virtual assistant associated with the mobile computing device.

6. The computer-implemented method of claim 1, wherein at least one of performing and generating are automatically triggered upon receipt of the message.

7. The computer-implemented method of claim 1, further comprising: activating the application automatically without requiring user acceptance of the suggestion.

8. The computer-implemented method of claim 1, further comprising: connecting the mobile computing device with a third party server.

9. The computer-implemented method of claim 1, wherein the suggestion is displayed on a graphical user interface associated with the mobile computing device.

10. The computer-implemented method of claim 1, wherein the one or more preferences includes at least one of classifying the action, connecting the mobile computing device with one of a third party server, service provider, and the application, how to perform the action when the message is sent from a particular user, and how to perform the action based on a type of the message.

11. A non-transitory computer-readable storage medium having a plurality of instructions stored thereon that when executed by a processor, cause the processor to perform operations comprising:
   receiving a message at a mobile computing device;
   performing natural language processing (NLP) based interpretation of the message via the mobile computing device;
   generating a suggestion of an action to be performed via an application of the mobile computing device, the action based upon, at least in part, the NLP-based interpretation of the message;
   providing the suggestion to a user of the mobile computing device based upon, at least in part, one or more user-configurable settings stored on computer storage set by the user receiving the message;
   receiving user acceptance of the suggestion of the action; and
   activating the application in response to receiving the user acceptance of the suggestion to enable the performance of the action via the application.

12. The non-transitory computer-readable storage medium of claim 11, wherein the message is one or more of an MMS message, an SMS message, an instant message, and an email message.

13. The non-transitory computer-readable storage medium of claim 11, wherein the NLP-based interpretation is performed on the mobile computing device.

14. The non-transitory computer-readable storage medium of claim 11, wherein the NLP-based interpretation is performed on a server that is in communication with the mobile computing device.

15. The non-transitory computer-readable storage medium of claim 11, wherein the suggestion is performed audibly via a virtual assistant associated with the mobile computing device.

16. A computing system, comprising:
   one or more processors configured to receive a message at a mobile computing device, the one or more processors further configured to perform natural language processing (NLP) based interpretation of the message via the mobile computing device, the one or more processors further configured to generate a suggestion of an action to be performed via an application of the mobile computing device, the action based upon, at least in part, the NLP-based interpretation of the message, the one or more processors further configured to provide the suggestion to a user of the mobile computing device based upon, at least in part, one or more user-configurable settings stored on computer storage set by the user receiving the message, the one or more processors further configured to receive user acceptance of the suggestion of the action, the one or more processors further configured to activate the application in response to receiving the user acceptance of the suggestion to enable the performance of the action via the application.

17. The system of claim 16, wherein at least one of performing and generating are automatically triggered upon receipt of the message.

18. The system of claim 16, wherein the one or more processors are further configured to activate the application automatically without requiring user acceptance of the suggestion.

* * * * *